3,518,122
FUEL CELL BATTERY FOR USE WITH AN ELECTROLYTE AS CARRIER FOR EMULSIFIED REAGENTS

Bernard Warszawski, Paris, France, assignor to Société General de Constructions Electriques et Mecaniques (Alsthom), Paris, France, a corporation of France
Filed Feb. 26, 1968, Ser. No. 708,224
Claims priority, application France, Feb. 24, 1967, 2,735
Int. Cl. H01v 27/00, 27/26
U.S. Cl. 136—86          6 Claims

ABSTRACT OF THE DISCLOSURE

A fuel cell battery is formed by stacking a number of similar fuel cell units, formed as thin plates. A separate supply duct system for electrolyte and for first and second type reagents is formed in the stack of the units, with interconnections formed immediately adjacent the faces of the fuel cell electrodes to mix electrolyte and emulsified reagent (of oxidizing, and reducing type, respectively, at different faces of the electrode) immediately prior to application of the electrolyte-reagent emulsion to the electrode face.

---

The present invention relates to fuel cells, and more particularly to fuel cell batteries in which an electrolyte acts as carrier for emulsified reagents (of the oxidizing and reducing type).

My co-pending patent application Ser. No. 708,338, filed Feb. 26, 1968 assigned to the assignee of the present invention discloses a fuel cell for use with an electrolyte acting as carrier for an emulsified reagent. The particular fuel cell described in said co-pending application includes an electrode which is formed as a thin, conductive sheet having a mesh or porus structure, the mesh or pore size being of the same order of magnitude as the thickness of the sheet, and varying between one to several tenths of a millimeter. A gaseous or liquid reactant is emulsified in an electrolyte, and circulated thorughout the meshes or pores of the electrode, from one edge to the opposite edge thereof, that is to say parallel to the central or median plane of the electrode. A semipermeable diaphragm is located opposite the electrode, and forms therewith a half-cell. By stacking such similar units, opposite sides of the diaphragm will face opposed sides of electrodes and form a complete set; stacking a plurality of such cells then forms a battery, with opposed faces of the electrodes cooperating with adjacent cells. The structure of the cell may be a mesh, but the word "mesh" is to be understood to include equivalent structures, such as metallic gauze or fabric, lattice, sheets of expanded metal, metallic sheets which are embossed with protuberances or projections, or the like.

Supply ducts for electrolyte to a battery of stacked half-cells, that is to stacked elements (electrodes and diaphragms) are provided by piercing openings through the edges of the stacked sheets, to thus form ducts. Supply ducts, as well as removal ducts for electrolyte will thus be formed, extending perpendicularly to the faces of the elements. Slits or notches are then formed in the elements, or in spacer members or frames therefor, to permit flow of electrolyte from the ducts formed by the stacked elements to the faces of the electrodes.

Operation of a fuel cell with an electrolyte carrying an emulsified reactant requires emulsions which, customarily, have been obtained by means of an emulsifying device. A variety of types are industrially available for a broad range of applications. Such emulsifying devices are accessories to the cell. They have a certain size, weight, and require a not entirely negligible expenditure of energy—all in addition to the volume and weight, and internal energy consumption of the cell itself. In the case of compact batteries of cells, which for satisfactory operation require a certain degree of uniformity of distribution and structure of the emulsion among the various electrodes, the production of the emulsion externally of the cell and subseqeunt introduction and distribution among different stacked half-cells over a network of ducts may result in non-uniformity of application of emulsions to the various cells. This is particularly true if the emulsion is not stabilized; the effect may be that the half-cell farthest from the place of production of the emulsion receives an emulsion, the composition of which is different from that flowing through the half-cell nearest the place of production thereof. Such non-uniformity introduces difficulties in the electrical and hydraulic co-operation of a large number of component cells due to the unduly high resulting non-uniformity in individual performance characteristics of each electrode when the reagents are not entirely uniform.

It is an object of the present invention to provide a fuel cell battery operable with an emulsion containing reactant and without any exterior emulsifier, and in which the characteristics of the composition of the emulsion are exactly reproducible and uniform, and in which non-uniformity of electrolyte and emulsion composition throughout the battery is avoided.

Subject matter of the present invention: Briefly, in accordance with the present invention, electrolyte and non-soluble gaseous or liquid reactants are injected at the edge of the electrode, the emulsion forming spontaneously through the simultaneous injection of the electrolyte and of the reactant into the porous, or mesh structures of the electrode. As a theoretical consideration, it appears that the porous or mesh structure itself assures the intermixing and dispersion of the two phases. Thus, supply ducts for electrolyte, and gaseous or liquid insoluble reactants can be separately provided, and the composition of electrolyte-reactant emulsion will be the same at each point of production, that is at each electrode.

Preferably, and in order to obtain uniformly produced and distributed emulsion at the surface of the electrodes, the passages for delivery of the electrolyte and of the gaseous or liquid reactants to be emulsified are arranged as networks of multiple ducts at the inlet side of the electrode.

The total cross-sectional area of the supply ducts is preferably chosen to be much less than the cross-sectional area for passage of the emulsion across the face of the electrode to be contacted thereby. The speed of flow in the supply ducts is thus much higher than the speed of flow of the electrode facing the emulsion itself. Injection speed at the point of widening of the cross-sectional area to the face of the electrode thus assists in the formation of the emulsion.

The formation of the emulsion is further improved if the passages which deliver the electrolyte and the passages that deliver the gaseous or liquid reactant to be emulsified are arranged in such a manner that they empty, one into the other, just before the point of delivery into the compartment filled by the mesh or porous structure of the electrode.

The structure, organization, and operation of the invention will now be described more specifically with reference to the accompanying drawings, wherein.

Figure 1:
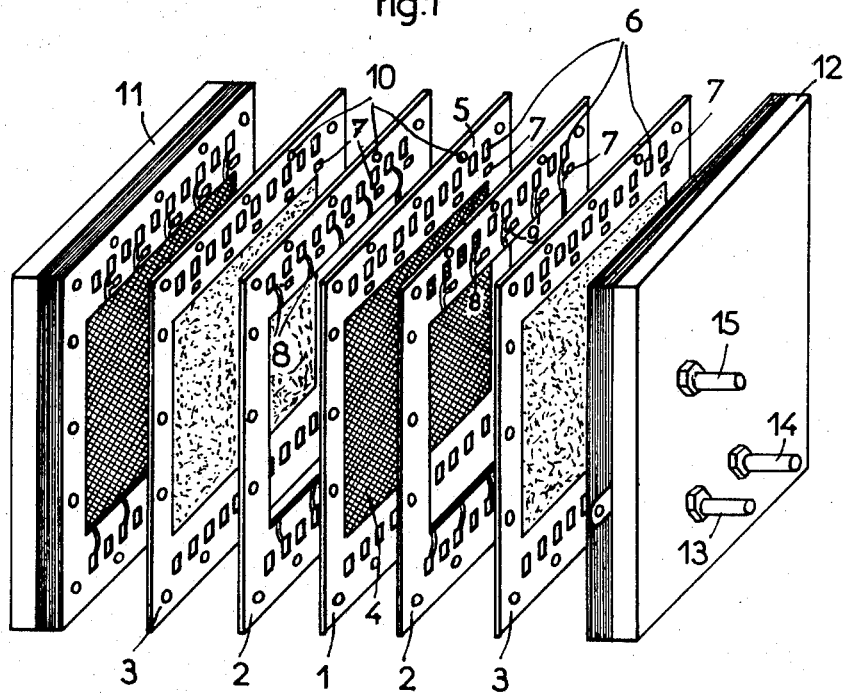
FIG. 1 is a perspective, partly exploded view of a battery in accordance with the present invention.

Referring now to the drawings and particularly to FIG. 1: The fuel cell itself is formed by electrodes 1, hydraulically separating a pair of half-cells. The electrode itself is formed with a central portion 4, illustrated as an embossed metallic sheet, and an outside frame 5, which is preferably of plastic, and formed with connecting openings therein. Adjacent both sides of the frame 5 are plastic spacer frames 2 having a central window into which the embossed metallic electrode extends. Adjacent frame 2 is a semi-permeable membrane unit 3, likewise retained in a plastic frame. The thickness of frame 2 is such that the central, active electrode portion 4 contacts adjacent diaphragms 3.

Insulating frames 2, the frames 5 of electrodes 1, and the flat end surfaces of the diaphragms 3 are pierced at their sides, for example at the upper side, by rows of openings 6 and 7; upon stacking of the entire assembly, as seen in FIG. 1, the aligned openings 6, 7 form parallel supply ducts. The odd-numbered ducts (first, third, fifth, etc.) for example, are supplied with electrolyte carrying one of the reactants. The evenly-numbered ducts 6 (second, fourth, etc.) are supplied only with electrolyte; ducts 7 then are supplied with reactants of a second type. The insulating frames 2 separate each electrode 1 from an adjacent diaphragm 3, that is they define at their central window space an electrolytic compartment. Besides the transverse ducts, they are further formed with notches or slits 8, which are quite thin, and which interconnect the central window to every other transverse opening 6. Slits 8 on the frame 2 are so arranged that those on one side of a cell communicate with the group of orifices which carry the electrolyte with one of the reagents, whereas the slits in the frames at the other side of the electrode face are so arranged that they communicate with the orifices where only electrolyte communicates and, further, are formed with thin slits 9 interconnecting ducts 7 to one of the slits 8 in order to provide for mixing of the other reagent with the electrolyte.

The side which is particularly described herein is the supply side. The lower side of the frames 2, that is at the right of FIG. 3, will be for removal of spent electrolyte. Only one row of openings is required. For certain applications it is also necessary to provide at the removal or drainage side more, less, or the same amount of slits as at the supply side for each frame 2, or to interconnect removal ducts, so that each duct will be larger.

By repetitive stacking of a large number of elementary units, making up half-cells, an entire battery of substantial power capacity is formed. The stacks of the elements 1, 2, 3 are locked and held together by means of bolts, not shown, and screwed against end plates 11, 12. Connections for the supply of electrolyte and reactant are secured to the end plates, as well connections for removal or drainage of spent electrolyte (not shown). Supply connection 13 supplies one electrolyte and a first reactant; supply connection 15 supplies a second reactant, and supply connection 14 is for supply of plain electrolyte. Each one of the connections 13, 14 is connected by internal distribution channels, not shown, within end blocks 11, 12 to the openings 6 forming the supply ducts. Similarly, connection 15 is connected by an internal channel to the ducts formed by the orifices 7.

Figure 2:
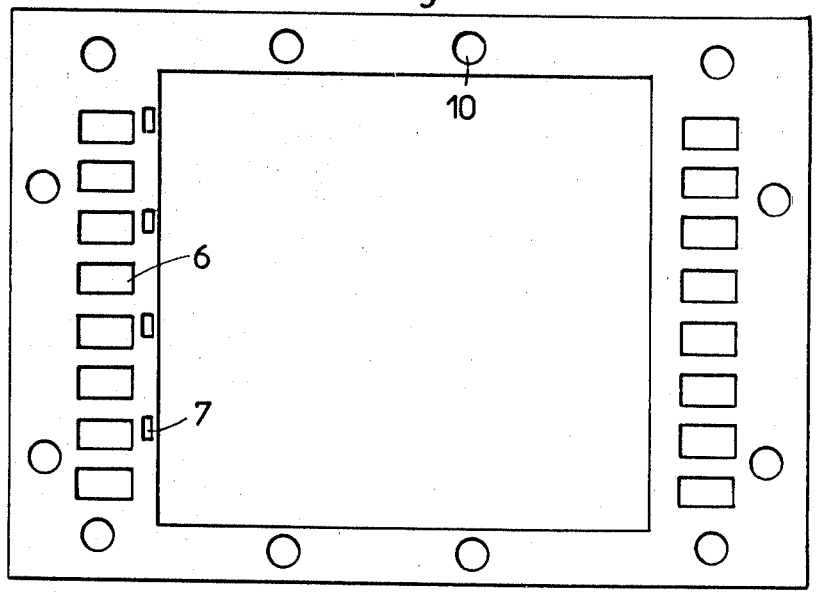
FIGS. 2, 3, 4 and 5 are plan views of two types of battery frames.
Figure 3:
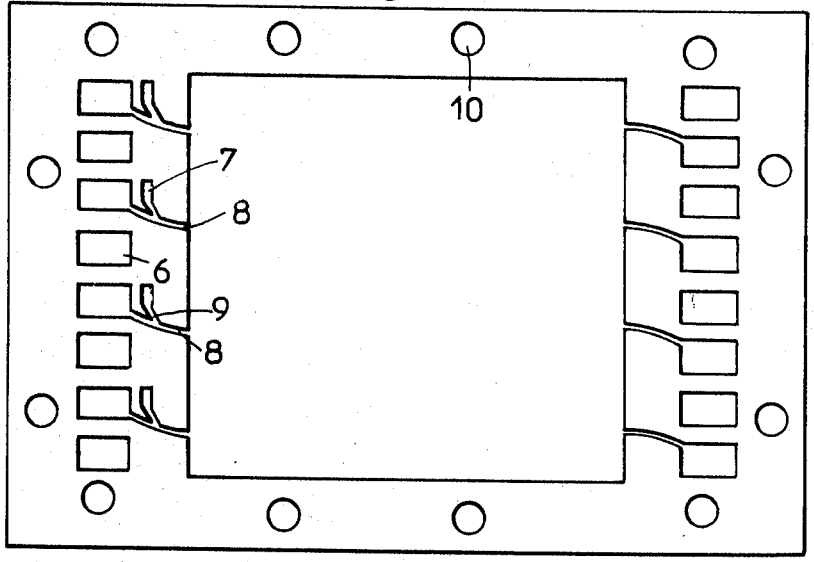

FIGS. 2 and 3 illustrate, in greater detail, frame 5 of an electrode and an adjacent frame 2 (to the right of the electrode with respect to FIG. 1), respectively, and illustrating in detail the distribution of plain electrolyte and a reactant, to be emulsified in the compartment formed by the porous, or mesh structure of the electrode. Frames 2 are thicker than the frames 5 and permit locking of the central portion 4 of the electrode within the window opening of frame 5.

The channels formed by openings 7 terminate by the slits 9 in slits 8 and at that point cause mixing of the electrolyte with the gas, or the liquid with which it is to be emulsified, before being supplied to the electrode. The structure of the electrode, and the much larger cross-sectional area than the width of the channels 8 assures excellent dispersion of the reactant in the electrolyte.

Figure 4:
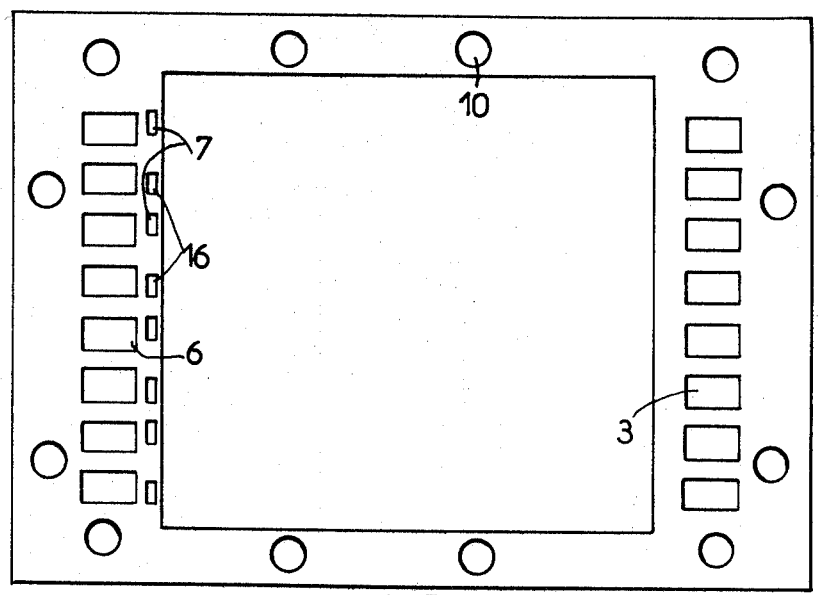
Figure 5:
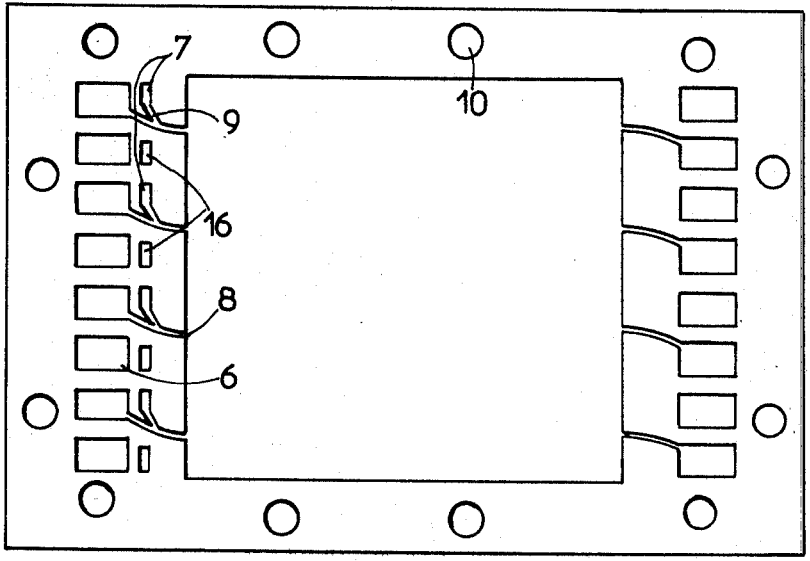

FIGS. 4, and 5 represent, respectively, a frame 5 and a frame 2 in which orifices 16 are interleaved between orifices 7 in order to provide for supply of gas or liquid to be emulsified to the other electrode, each half-cell being supplied with pure electrolyte and reagent, respectively.

Figure 6:
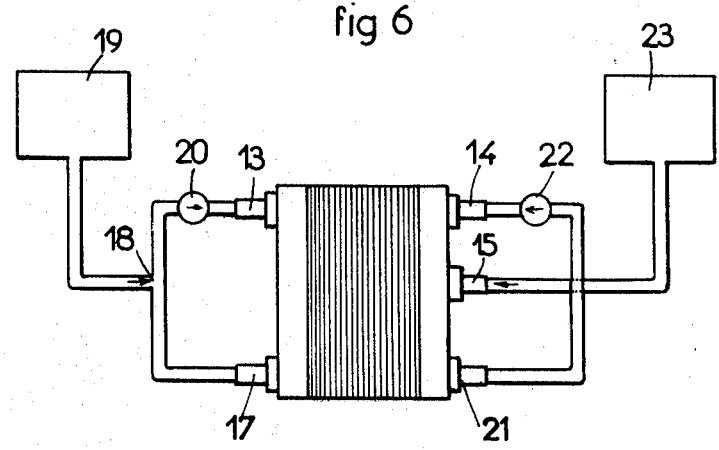
FIG. 6 is a schematic liquid circulation diagram illustrating flow of electrolyte and reactant.

FIG. 6 illustrates the fluid connection diagram for circulation of electrolyte for a battery similar to that illustrated in FIG. 1. Electrolyte leaves the battery by a stub 17; it is supplied, at 18, with a reactant, supplied by gravity from a tank 19. It is returned to the battery by a pump 20 through inlet stub 13. Another type of electrolyte, removed from the battery by stub 21, is pumped by a pump 22 into the inlet stub 14. Supply reservoir 23 is gravity-feed connected to inlet stub 15 for reactant to be emulsified in the interior of the battery, as previously described.

The present invention has been illustrated and described in connection with a fuel cell battery in which one type of reagent (for example, oxidizing) is mixed with electrolyte, and another type of reagent (reducing) is applied separately to neutral electrolyte, to be mixed with the electrolyte immediately before application to the electrodes. The present invention is not intended to be limited to the details shown, and various structural changes and modifications, as determined by the requirements of particular applications or uses may be made without departing from the inventive concept.

I claim:

1. Fuel cell battery in which at least one electrolyte acts as carrier of emulsifiable reagent comprising
   a stack of similar fuel cell units, each unit including a thin sheet of conductive, porous material forming an electrode, the pores being in the order of the thickness of the sheet and about one tenth to sevral tenths of a millimeter, and a semi-permeable diaphragm;
   means directing electrolyte-reagent emulsion across one face of said electrodes and parallel to the median plane thereof from one edge to an opposite edge of said electrode;
   means forming supply channels for said electrolyte;
   means separate from said electrolyte channels forming supply channels for a first reagent;
   and mixing means adjacent said face of said electrodes interconnecting said electrolyte supply channels and said first reagent supply channels to provide for mixing of electrolyte and reagent and formation of said emulsion immediately preceding the application of said electrolyte-reagent mixture to said face of said electrodes.

2. Battery according to claim 1 wherein a pair of supply channels for first, and second reactants respectively are provided for different types of reactant;
   said mixing means alternately interconnecting the reactants in each said channels, respectively, with said electrolyte-containing channel, respectively and applying electrolyte mixed with first and second type reactants to opposite faces of said electrodes.

3. Battery according to claim 1 wherein said means adjacent the faces of the electrodes interconnecting said reactant and electrolyte supply channels include a network of multiple slits terminating along one side of the electrode.

4. Battery according to claim 1 wherein the total cross-sectional area of the supply channels for the electrolyte and the supply channels for the reactant is substantially less than the area of flow of emulsion across the face of the electrode.

5. Battery according to claim 1 including slits formed within the battery cells interconnecting the supply channels for electrolyte and at least one face of an electrode of each cell; and slits interconnecting the supply channels for a reactant with said slits supplying electrolyte to the electrodes so that electrolyte and reactant will mix before application of said mixture to the electrodes.

6. Battery according to claim 1 wherein each cell unit includes spacer members interposed between said electrode sheets and said semi-permeable diaphragms, said spaced members being formed with a central window, the active area of said electrode being located within said central window; and slits formed at the edge portions of said spacer members and interconnecting said supply channels with the central window.

References Cited
UNITED STATES PATENTS

| | | | |
|---|---|---|---|
| 3,215,563 | 11/1965 | Clemm | 136—86 |
| 3,278,336 | 10/1966 | Uline et al. | 136—86 |
| 3,351,492 | 11/1967 | Heyes et al. | 136—86 |
| 3,413,152 | 11/1968 | Folkins et al. | 136—86 |

FOREIGN PATENTS 1,399,765  4/1965  France.

ALLEN B. CURTIS, Primary Examiner